Oct. 9, 1928.

1,686,815

E. S. IMES

METHOD OF TESTING MAGNETIZABLE OBJECTS

Filed May 26, 1925   3 Sheets-Sheet 1

INVENTOR
Elmer S. Imes
BY
ATTORNEY

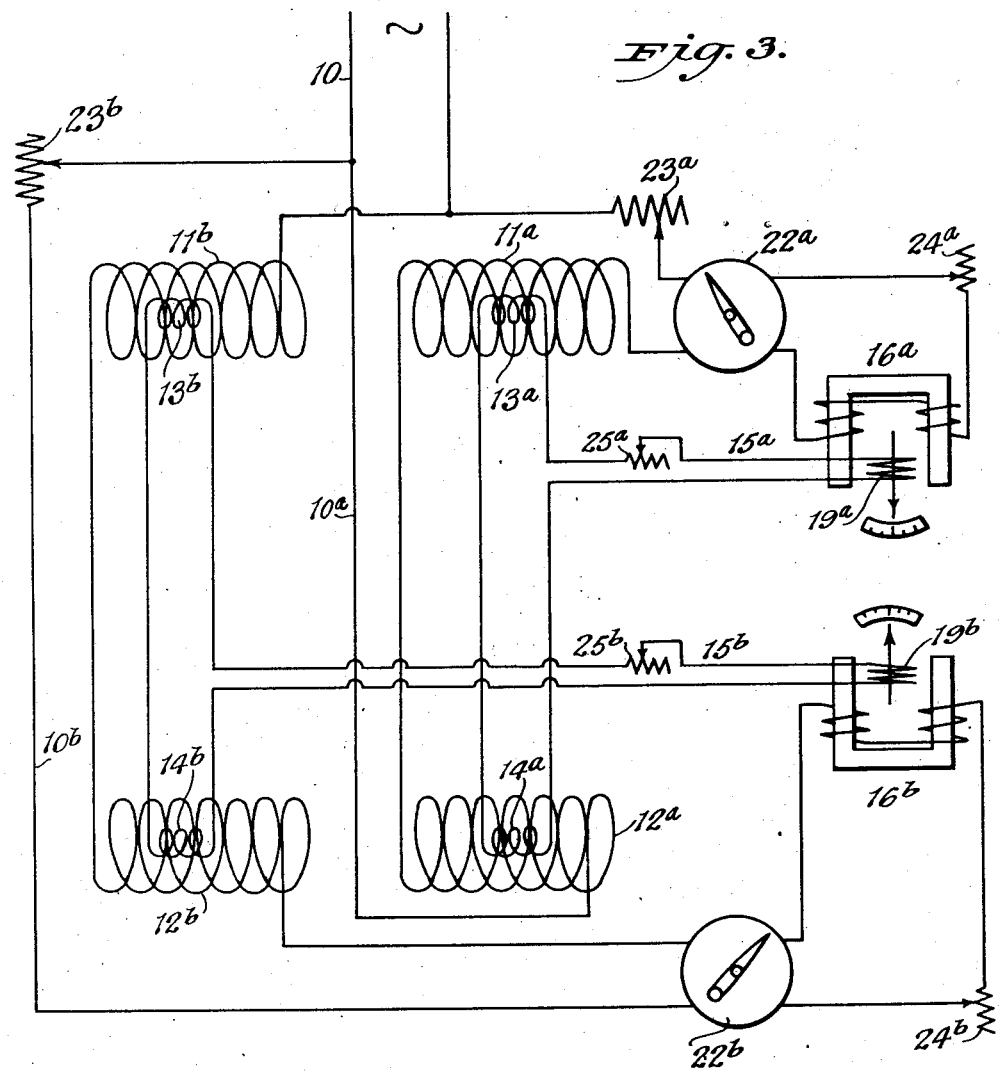

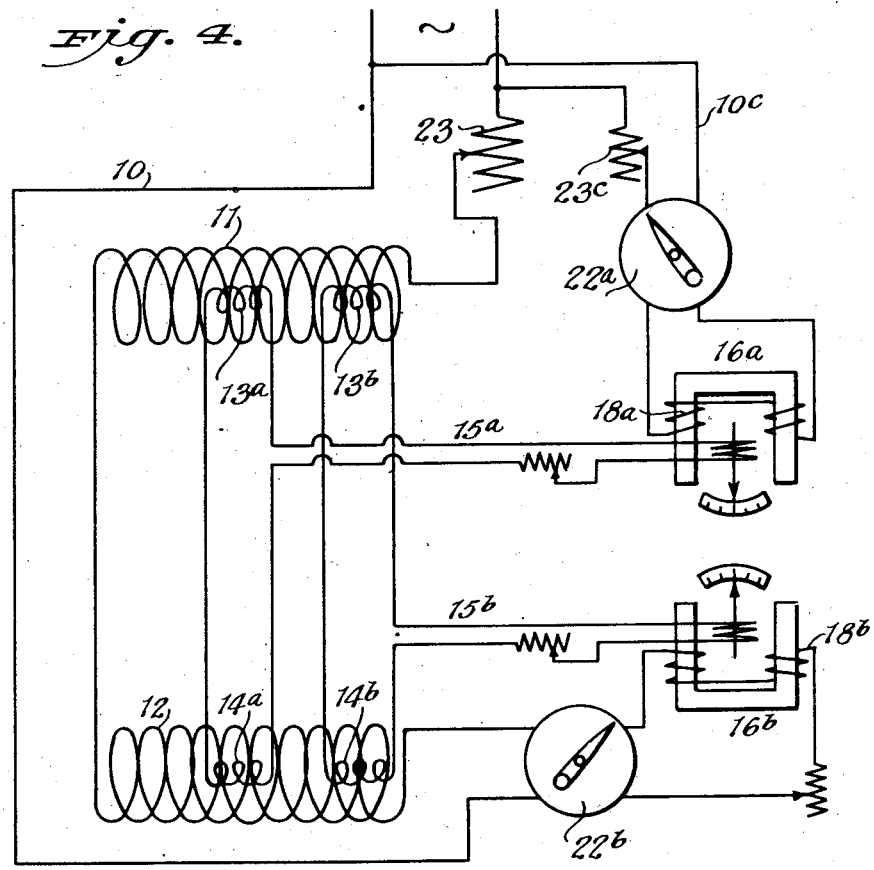

Patented Oct. 9, 1928.

1,686,815

UNITED STATES PATENT OFFICE.

ELMER S. IMES, OF JERSEY CITY, NEW JERSEY, ASSIGNOR, BY MESNE ASSIGNMENTS, TO MAGNETIC ANALYSIS CORPORATION, OF LONG ISLAND CITY, NEW YORK, A CORPORATION OF NEW YORK.

METHOD OF TESTING MAGNETIZABLE OBJECTS.

Application filed May 26, 1925. Serial No. 32,947.

My invention relates to methods of testing magnetizable objects and is an improvement on the method and apparatus invented jointly by C. W. Burrows and myself for which application was filed October 20, 1923, Serial No. 669,726.

It is a primary object of my present invention to provide a method for magnetically determining a plurality of physical characteristics of a specimen when all of such characteristics are unknown. More specifically, my invention relates to a method for determining the physical characteristics produced by the temperatures at which specimens of steel are quenched and drawn when neither the draw nor the quench temperatures are known.

It will be understood that the quench temperature controls grain size of a specimen and the draw temperature the structure or hardness of the steel. In commercial practice it is impossible to hold either the quenching temperature or the drawing temperature within close limits with the result that commercial steel is apt to vary widely from desired standard. Ordinary physical tests such as the Brinell, the Rockwell, etc. do not distinguish between the factors of quench and draw. A specimen may be quenched at the desired temperature and either over or under-drawn or it may be drawn at the desired temperature or either over or under-quenched. Again the specimen may vary from the standard in both of these factors. In other words, it may be either over-quenched and under-drawn, or over-quenched and over-drawn, or again it may be under-quenched and over-drawn, or under-quenched and underdrawn. For certain classes of work variations due to quench are not of as great importance as variations due to draw and in other classes of work the reverse holds true. It is obviously of importance then to determine how the material under test varies from standard either as regards quench or as regards draw or as regards both quench and draw so as to discard the material which exceeds the tolerances set for either the quench or draw factors.

The ordinary physical tests, such as those above mentioned, give a local measurement, and it is desirable in practice to provide for a continuous indication of the condition of the entire specimen as regards physical characteristics due to quench and draw, so that any points in the specimen which varied from pre-determined standards could be detected.

An object of my invention is to provide an improved method of comparing any specimen with a standard of known quench to determine whether the specimen has been over or under quenched with respect to the standard, to set positive and negative tolerances, and to determine whether the specimen exceeds such tolerances.

Another object of my invention is to provide a method which will not only permit of testing for quench as above described, but will also permit of determining whether a specimen has been over or under drawn with respect to a standard, to establish positive and negative draw tolerances, and to determine whether the specimen falls within such tolerances.

A further object of my invention is to provide for comparing a specimen of unknown quench and unknown draw with a standard of known quench and draw, to determine variations of the specimen from the standard as regards the factors of quench and draw simultaneously, to measure the extent of the variation, and to determine whether the specimen falls within allowable limits as to either of such factors.

A still further object of my invention is to provide for a continuous test of a specimen throughout its length to determine its variance from standard as to quench or draw separately or simultaneously.

Other objects of my invention will appear as the specification of my invention proceeds.

In the accompanying drawings:

Fig. 3 is a modification of the apparatus shown in Fig. 2; and

Fig. 4 is a further modification of the apparatus shown in Fig. 2.

Figure 1:
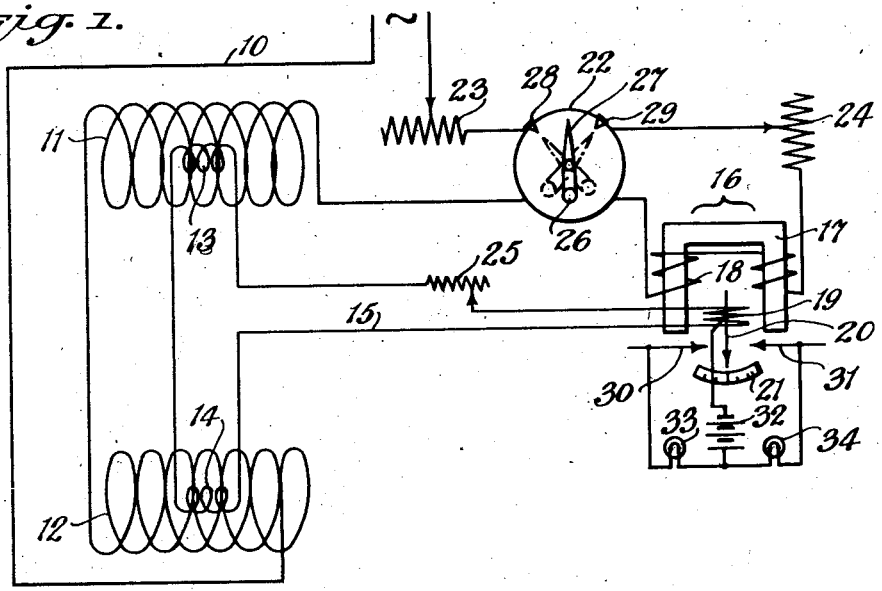
Figure 1 is a diagrammatic view of one form of my testing apparatus in which a specimen may be tested as to one characteristic at a time.

Referring to Figure 1, I have used the reference numeral 10 to indicate a primary circuit connected with a source of alternating current which is not shown. In the circuit 10 there are two primary coils 11 and 12 respectively which are connected in series. In the magnetic field of these coils and preferably within these coils are two secondary coils 13 and 14 respectively, which form part of a secondary or induced circuit 15. A dynamometer is indicated as a whole at 16 which comprises the usual core 17 about which are wound the field coils 18, the latter being connected in series with the primary coils 11 and 12 in the primary circuit 10. The potential coil 19 of the dynamometer is connected in series with the secondary coils 13 and 14. The coils 13 and 14, however, are oppositely wound or connected in bucked relation so that the potential coil 19 receives only the differential energy induced in coils 13 and 14 respectively. The coils 11 and 12 are carefully balanced to produce magnetic fields of the same intensity and the coils 13 and 14 are carefully balanced so as normally to produce no current in the secondary circuit 15. The potential coil is provided with an indicator needle 20 and dial 21.

In order to vary the phase relation between coils 18 and coil 19, a variable phase shifter 22 is connected across the primary circuit between the primary coils and the dynamometer. A non-inductive resistance 23 is provided in the primary circuit to vary the current passing through the primary coils and a variable non-inductive resistance 24 is provided to vary the current passing through field coils 18 of the dynamometer. A non-inductive variable resistance 25 is also provided for varying the current passing through the potential coil 19.

The phase shifter 22 is operated by a lever 26 to shift the phase of current passing through the field coils 18. A pointer 27 serves to indicate the extent of phase variance on the dial of the phase shifter. An indicator 28 is adjustable on the dial to register a certain position of the pointer 27 and a second indicator 29 is also adjustable on the dial of the phase shifter to indicate another position of the pointer 27.

The pointer 20 of the dynamometer is adapted to make contact with either contact 30 or contact 31 of two relay circuits. When the contact is closed through contact pointer 30, current from battery 32 energizes lamp 33. When the pointer 22 contacts with contact pointer 31, current from battery 32 energizes lamp 34.

My method of operation is based on the discovery that with a certain magnetizing force in the primary circuit and a certain phase angle between the field and potential coils of the dynamometer, a maximum difference will be shown on the dynamometer between two specimens of like quench but different draw and if the phase be shifted through an angle of approximately 90° no variations will be shown between the two specimens but a maximum variation will be shown between specimens of like draw, but different quench.

In operation therefore, the apparatus must be set either to determine variations in quench or in draw. Having determined a certain standard quenched temperature Q and draw temperature D, three standards are prepared which are of the same composition as the specimens to be tested. For convenience, these standards will be referred to as A, B and C, the standard A is quenched at temperature Q and drawn at temperature D. Standard B is also quenched at temperature Q but drawn at a different temperature D'. Standard C is quenched at a different quench temperature Q' but drawn at the standard draw temperature D. Standard A is now placed in the secondary coil 13 and B in the secondary coil 14 and the variable resistance 23 and phase shifter 22 are adjusted until the widest variation is shown in the dynamometer 16. Because the two specimens are quenched at the same temperature this must represent the variation produced by the difference of draw between standards A and B. The phase shifter is now adjusted until the needle 20 comes to a neutral or zero position indicating no difference between the two standards. The indicator 28 is then shifted on the dial to alinement with the pointer 27 to mark the position to which the phase shifter must be adjusted to set the apparatus for measuring variations of quench, for in this position it is evident that the apparatus is insensitive to variations of draw between the two standards. The standard B is now withdrawn from coil 14 and standard C is inserted. This standard, it will be recalled, is drawn at the same temperature as standard A but is quenched at a different temperature, consequently the dynamometer will show a considerable variation due to the difference of quench between the two standards. The phase shifter is now adjusted back through approximately 90 degrees until needle 20 comes to zero position and indicator 29 is adjusted to alinement with pointer 27 to indicate the shift of phase necessary to eliminate variations of quench and determine variations of draw. The apparatus is now ready to test specimens whose quench temperature and draw temperature are not known.

Standard C is withdrawn from coil 14 and a specimen to be tested is inserted in its place.

If it be desired to determine variations of quench, the phase shifter is adjusted until the needle 27 is alined with indicator 28. The dynamometer will show no reading if the specimen was quenched at the same temperature as the standard A but if it was quenched at a higher or lower temperature, the needle 20 will move to the right or the left as the case may be, and the variation may be read on the dial 21. Then the phase shifter is adjusted until the needle points to indicator 29 when the reading of needle 20 with respect to the dial 21, will indicate whether the specimen was drawn at the standard temperature D or whether it is drawn at above or below that standard. The sensitivity of the instrument may be adjusted by means of the variable resistance 25. Contacts 30 and 31 are also adjustable in accordance with the tolerance allowable. When a specimen exceeds the tolerance in one direction or the other, lamps 33 or 34 will be lighted. Lamp 33 for instance, may indicate that the specimen is coarser than the standard by such an amount as to render it unsuitable for the particular work for which it is intended, while 34 will indicate that it is finer than the permissible grain size. The apparatus may be adjusted for a given tolerance of quench or of draw by moving contact points 30 and 31 with respect to the zero position of needle 20 or by adjusting variable resistance 25 to adjust the sensitivity of the apparatus.

If the specimen to be tested is in the form of a wire, rod or strip of metal, it may be fed through the secondary coil 14 at any suitable rate of speed and the needle 20 will indicate the degree of departure of the specimen from the standard with respect to either quench or draw depending upon the setting of the phase shifter 22, and wherever the variation exceeds the established tolerance either on the plus or minus side, the same will be indicated by the lighting of lamps 33 or 34. It will be evident of course, that any other form of signal can be used to indicate any variation of the specimen beyond the tolerances set. The relay circuits may control a marking device which will mark the specimen wherever the variations exceed the tolerances set so that after the specimen has run through the testing apparatus it will be possible to locate and cut out the faulty sections.

With the apparatus as shown in Figure 1, the specimen must be run through the test coil 14 at one setting of the phase shifter to determine variation due to quench and another setting of the phase shifter to determine variation due to draw. The modification shown in Fig. 2 permits of taking readings of draw and quench simultaneously at a single run of the specimen through the apparatus. In this figure parts which correspond to those shown in Fig. 1 are indicated with like or corresponding numerals. The primary circuit of the apparatus is indicated by numeral 10 and there are two primary coils 11 and 12 connected in series. In coil 11 there are two secondary or test coils $13^a$ and $13^b$, and in coil 12 there are two test coils $14^a$ and $14^b$. Two dynamometers are employed, one indicated by numeral $16^a$ and the other by $16^b$. The test coils $13^a$ and $14^a$ are connected in bucked relation in a secondary circuit $15^a$ which includes the potential coil $19^a$ of dynamometer $16^a$. Test coils $13^b$ and $14^b$ are connected in bucked relation in a secondary circuit $15^b$ which includes the potential coil $19^b$ of dynamometer $16^b$. A phase shifter $22^a$ serves to shift the phase of current passing through field coils $18^a$ of dynamometer $16^a$, and a phase shifter $22^b$ serves to shift the phase of coils $18^b$ of dynamometer $16^b$. Potential coil $19^a$ carries an indicator needle $20^a$ which swings over the dial $21^a$ and potential coil $19^b$ carries a needle $20^b$ which swings over the dial $21^b$. Obviously relay signal circuits could be controlled by each dynamometer, after the manner shown in Fig. 1, but for the sake of clearness they have been omitted from the drawing.

In setting this apparatus for test, a procedure is followed similar to that described above in connection with the apparatus shown in Fig. 1. Standard A is placed in the test coils $13^a$ and $13^b$ and standard B in the test coils $14^a$ and $14^b$. The apparatus is then adjusted by operating variable resistance 23 and phase shifter $22^a$ to show the maximum variation in the dynamometer $16^a$, after which phase shifter $22^a$ is adjusted to bring the needle $20^a$ to neutral position. This gives the setting for quench. Standard B is then replaced with standard C and phase shifter $22^b$ is adjusted to bring the needle $20^b$ to neutral position, which gives the setting for reading of draw. Standard C is then removed and specimens to be tested are passed through the test coils $14^a$ and $14^b$, whereupon dynamometer $16^a$ will indicate variations from the standard of quench and dynamometer $16^b$ variations from the standard of draw. The test coils of circuit $15^a$ and $15^b$ are not located in the same position with respect to the primary coils 11 and 12. The test coils of circuit $15^a$ being nearer the center of the primary coils will be subjected to a more intense magnetic field than the other test coils which are close to the ends of the primary coils. Consequently, there will be a variation in the sensitivity of the two dynamometers. I have found that better results are obtained by using a somewhat different field intensity for testing for quench. Consequently, the positions of the pairs of test coils are adjustable within the primary so that the pair of test coils of one circuit will be nearer the maximum intensity of the fields induced by the primary coils, while the pair of test coils of the other circuit are moved to a point where they are subjected to a field of lower intensity. By this means, the apparatus may be varied to suit different requirements. The relative position of the test coils in the primary coils will vary to some extent with the composition of the specimens to be tested. The composition of the specimens will also determine the intensity of current best suited for energizing the primary coils.

While I have described dynamometer $16^a$ as measuring variations due to quench and $16^b$ as measuring variations due to draw, it will be evident that the conditions could be reversed so that $16^b$ would give a measure due to quench and $16^a$ a measure due to draw by properly adjusting the phase shifters connected with the respectve dynamometers.

Figure 2:
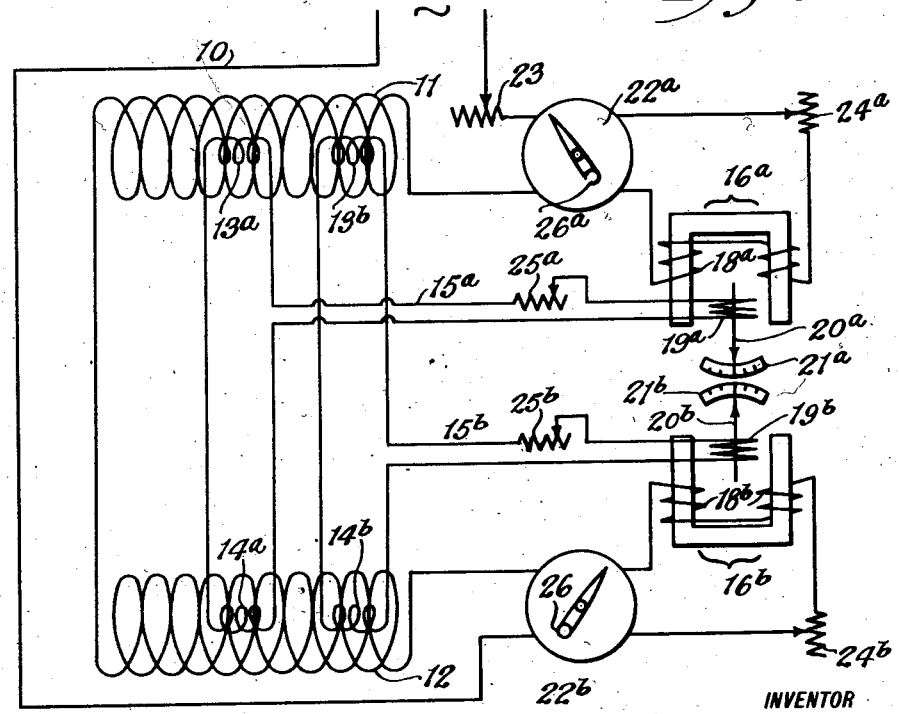
Figure 2 is a diagrammatic view of a modified form of testing apparatus in which the specimen may be tested as to two characteristics at the same time.

The modification shown in Fig. 3 is similar to that shown in Fig. 2 and like parts are indicated by corresponding reference numerals. It will be observed, however, that the circuit 10 branches into two primary circuits $10^a$ and $10^b$, which are connected in parallel and in each of which there is a pair of primary coils, the coils in circuit $10^a$ being designated by the numerals $11^a$ and $12^a$ and those in circuit $10^b$ by the numerals $12^b$ and $12^b$. Test coils $13^a$ and $14^a$ are located in the primary coils $11^a$ and $12^a$ respectively, and form part of secondary circuit $15^a$ which includes the potential coil $19^a$ of dynamometer $16^a$. The field coils $18^a$ of this dynamometer are included in the circuit $10^a$ and phase shifter $22^a$ is provided to shift the phase of the current passing through said field coils. A variable resistance $23^a$ permits of varying the field intensity of the primary coils $11^a$ and $12^a$. Similarly test coils $13^b$ and $14^b$ are placed in coils $11^b$ and $12^b$ respectively and form part of the secondary circuit $15^b$ which includes potential coil $19^b$ of dynamometer $16^b$. The field coils $18^b$ of dynamometer $16^b$ are included in the circuit$^b$ 10 and a phase shifter $22^b$ is provided for shifting the phase in the field coils $18^b$. Variable resistance $23^b$ permits of varying the field intensity generated by the coils $11^b$ and $12^b$.

The method of setting this apparatus for test is identical with that used for setting the apparatus shown in Fig. 2. The test coils of circuit $15^a$ and $15^b$ may be alined so that a single standard may be placed in the coils $13^a$ and $13^b$ and a specimen can then be passed through coils $14^a$ and $14^b$ to compare it with the standard as to quench on one of the dynamometers and as to draw on the other. If desirable, however, the test coils of the two secondary circuits may be placed out of alinement so that a specimen can be passed through coil $14^a$ and tested against a standard placed in coil $13^a$, while another specimen is being tested by passing it through coil $14^b$ and comparing it as to a standard placed in coil $13^b$. Either dynamometer may be adjusted to give readings due to quench or to draw, as desired. The advantage of the arrangement shown in Fig. 3 lies in the fact that the field intensity generated by the primary coils of one circuit may be adjusted entirely independently of that generated by primary coils of the other circuit, so that there will be a greater flexibility in adjusting the apparatus and tolerances for each variable factor can be set more conveniently and with greater accuracy by dividing the apparatus into two parts which are individually adjustable.

Fig. 4 represents a modification which follows closely the arrangement shown in Fig. 2, differing therefrom only in the fact that the field coils $18^a$ of dynamometer $16^a$, instead of being connected in series with the primary coils 11 and 12, form part of a circuit $10^c$ which is connected in parallel with the circuit 10. Phase shifter $22^a$ is placed in the circuit $10^c$ and a variable non-inductive resistance $23^c$ is provided to adjust the intensity of the current passing through the field coils in the dynamometer $16^a$. The indication produced by the dynamometer $16^a$ does not represent a differential of energy but rather a differential of potential induced in the secondary circuit $15^a$. I have found that very satisfactory measures of variations in quench may be obtained by means of a potential reading rather than an energy reading in the secondary circuit. Consequently, with this arrangement, it is preferable to make measurements for variations of quench with the dynamometer $16^a$ and measurements for variations of draw with the dynamometer of $16^b$ whose field coils $18^b$ are included in the primary circuit 10 in exactly the same manner as in the apparatus illustrated in Fig. 2.

While the drawings all show dynamometers having an iron core, I do not limit myself to the use of this form of instrument but consider myself at liberty to use any instrument that gives the desired energy indication; for instance, a precision watt dynamometer without iron core is most suitable for certain measurements. Similarly I do not confine myself to the use of any particular type of phase shifter as there are several types which would be suitable for use in my testing apparatus.

I claim:

1. A method of determining one physical characteristic of a magnetizable object possessing two physical characteristics of unknown value, which consists in subjecting two standards to a varying magnetic field, said characteristics being pre-determined in each of the standards and one standard differing from the other as to the value of one of said characteristics, measuring on a dynamometer the differential energy absorbed by the two standards, adjusting the dynamometer to show no variation between the two standards, replacing one of the standards with the object to be tested, and noting the differential energy indicated by the dynamometer.

2. A method of determining one physical characteristic of a magnetizable object possessing two physical characteristics of unknown value, which consists in subjecting two standards to a varying magnetic field, said characteristics being pre-determined in each of said standards, the standards being alike as to the value of one of said characteristics but differing as to the value of the other of said physical characteristics, noting on a dynamometer the differential energy absorbed by the two standards, adjusting the phase variance between the coils of the dynamometer to indicate no variation between the standards, replacing the second standard with the object to be tested, and noting the differential energy indicated by the dynamometer.

3. A method of determining one physical characteristic of a magnetizable object possessing two physical characteristics of unknown value, which consists in subjecting to a magnetic field two standards possessing said physical characteristics, said characteristics being pre-determined, the two standards being alike as to the value of one of said characteristics but differing as to the value of the other of said characteristics, measuring on a dynamometer the differential energy absorbed by the two standards, adjusting the phase variance between the coils of the dynamometer and varying the maximum intensity of said magnetic field to show a maximum reading on the dynamometer, adjusting the phase variance to show a zero indication on the dynamometer, replacing one of the standards with the object to be tested, and noting the differential energy indicated by the dynamometer.

4. A method of determining one physical characteristic of a magnetizable object possessing two physical characteristics of unknown value, which consists in placing two standards in the secondary coils of two transformers, both of the standards being alike as to one of said characteristics and differing as to the other of said characteristics, the two secondary coils being bucked and connected in series with the potential coil of a dynamometer, the primary coils of the transformers being connected in series with the field coil of said dynamometer, energizing the transformers, noting the differential energy indication on the dynamometer, varying the phase relation between the field and potential coils of the dynamometer to show a zero indication, replacing one of the standards with the object to be tested, and indicating by means of the dynamometer the variation of the object from the remaining standard.

5. A method of determining one physical characteristic of a magnetizable object possessing two physical characteristics of unknown value, which consists in placing two standards in the secondary coils of two transformers both of the standards being alike as to one of said characteristics and differing as to the other of said characteristics, the two secondary coils being bucked and connected in series with the potential coil of a dynamometer, the primary coils being connected in series with the field coils of said dynamometer, energizing the transformers, varying the maximum field intensity of the transformers and adjusting the phase relation between the field and potential coils of the dynamometer to indicate the maximum variation between the two standards, adjusting said phase relation to show no variation between the standards, replacing one of the standards with the object to be tested, and indicating by means of the dynamometer the variation of the object from the remaining standard.

6. A method of testing a magnetizable object to determine two physical characteristics of unknown value, which consists in subjecting to a varying magnetic field two standards in which the values of said physical characteristics have been pre-determined, the first standard differing from the second standard as to the value of one of said physical characteristics, observing on a dynamometer the differential energy absorbed by the two standards, adjusting the phase relation of the dynamometer to show a zero reading, replacing the second standard with a third standard differing from the first standard as to value of the other of said physical characteristics, observing on a second dynamometer the differential energy absorbed by the first and third standards, adjusting the phase relation between the coils of the second dynamometer to show a zero reading, replacing the third standard with the object to be tested, and noting variations of the specimen from the first standard as to one physical characteristic on one dynamometer and as to the other physical characteristic on the other dynamometer.

7. A method of testing a magnetizable object to determine simultaneously two physical characteristics of unknown value, which consists in subjecting to a varying magnetic field two standards in which the values of said physical characteristics have been pre-determined, the first standard differing from the second standard as to the value of one of said physical characteristics, observing on a dynamometer the differential energy absorbed by the two standards, varying the maximum intensity of said field and adjusting the phase variance between the coils of the dynamometer to show a maximum reading, adjusting the phase relation to show a zero reading, replacing the second standard with a third standard differing from the first standard as to value of the other of said physical characteristics, observing on a second dynamometer the differential energy absorbed by the first and third standards, adjusting the phase relation between the coils of the second dynamometer to show a zero reading, replacing the third standard with the object to be tested, and noting variations of the specimen from the first standard as to one physical characteristic on one dynamometer and as to the other physical characteristic on the other dynamometer.

ELMER S. IMES.